(12) United States Patent
Zhao et al.

(10) Patent No.: US 12,289,686 B2
(45) Date of Patent: *Apr. 29, 2025

(54) METHOD AND APPARATUS FOR DERMINING TRANSMISSION POWER FOR SIDELINK CHANNEL

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,330

(22) Filed: Jul. 25, 2022

(65) Prior Publication Data
US 2022/0361113 A1    Nov. 10, 2022

Related U.S. Application Data

(63) Continuation of application No. 17/401,153, filed on Aug. 12, 2021, now Pat. No. 11,425,660, which is a
(Continued)

(51) Int. Cl.
*H04W 52/14* (2009.01)
*H04W 52/24* (2009.01)
(Continued)

(52) U.S. Cl.
CPC ......... *H04W 52/14* (2013.01); *H04W 52/242* (2013.01); *H04W 52/367* (2013.01); *H04W 72/1263* (2013.01); *H04W 72/569* (2023.01)

(58) Field of Classification Search
CPC . H04W 52/14; H04W 52/242; H04W 52/367; H04W 52/226; H04W 52/247;
(Continued)

(56) References Cited

U.S. PATENT DOCUMENTS

| 2013/0324182 A1 | 12/2013 | Deng et al. |
| 2014/0233476 A1 | 8/2014 | Kwak et al. |

(Continued)

FOREIGN PATENT DOCUMENTS

| CN | 107018564 A | 8/2017 |
| CN | 107040865 A | 8/2017 |

(Continued)

OTHER PUBLICATIONS

First Office Action issued in corresponding Japanese application No. 2021-547280, mailed Dec. 20, 2022.
(Continued)

*Primary Examiner* — Ricardo H Castaneyra
(74) *Attorney, Agent, or Firm* — BAYES PLLC

(57) ABSTRACT

Provided are a method and apparatus for wireless communication capable of meeting data transmission requirements. The method comprises: a first terminal determining, according to a first criterion, a target transmission power for a first physical sidelink channel; and the first terminal using the target transmission power to send the first physical sidelink channel to a second terminal.

20 Claims, 3 Drawing Sheets

200

A first terminal determines a target transmission power for a first physical sidelink channel according to a first criterion — S210

The first terminal transmits the first physical sidelink channel to a second terminal with the target transmission power — S220

Related U.S. Application Data continuation of application No. PCT/CN2019/075293, filed on Feb. 15, 2019.

(51) Int. Cl.
*H04W 52/36* (2009.01)
*H04W 72/1263* (2023.01)
*H04W 72/566* (2023.01)

(58) Field of Classification Search
CPC . H04W 52/281; H04W 52/346; H04W 52/12; H04W 52/383; H04W 52/246; H04W 52/24; H04W 72/1263; H04W 72/569; H04W 4/40; H04W 92/18
USPC .......................................................... 370/318
See application file for complete search history.

(56) References Cited

U.S. PATENT DOCUMENTS

| | | | |
|---|---|---|---|
| 2018/0014262 A1* | 1/2018 | Lee | H04W 76/14 |
| 2018/0041969 A1 | 2/2018 | Kwak et al. | |
| 2019/0253977 A1* | 8/2019 | Wang | H04W 52/383 |
| 2019/0356451 A1* | 11/2019 | Zhang | H04W 72/23 |
| 2019/0387377 A1* | 12/2019 | Zhang | H04W 52/383 |
| 2020/0022089 A1* | 1/2020 | Guo | H04W 24/08 |
| 2020/0053743 A1* | 2/2020 | Cheng | H04W 4/40 |

FOREIGN PATENT DOCUMENTS

| | | |
|---|---|---|
| CN | 107889157 A | 4/2018 |
| CN | 108616840 A | 10/2018 |
| CN | 108632782 A | 10/2018 |
| CN | 109257810 A | 1/2019 |
| CN | 112399540 A | 2/2021 |
| EP | 3402255 A1 | 11/2018 |
| EP | 3515126 A1 | 7/2019 |
| EP | 3913994 B1 | 8/2020 |
| JP | 2016513407 A | 5/2016 |
| WO | 2015019179 A2 | 2/2015 |
| WO | 2017070957 A1 | 5/2017 |
| WO | 2017143913 A1 | 8/2017 |
| WO | 2018058470 A1 | 4/2018 |
| WO | 2018201415 A1 | 11/2018 |

OTHER PUBLICATIONS

Huawei et al., "Power control and power sharing for V2X sidelink", R1-1900861, 3GPP TSG RAN WG1 Ad-Hoc Meeting 1901 Taipei, Jan. 21-25, 2019.

3gpp ts 36.213 V15.4.0 (Dec. 2018); Technical Specification Group Radio Access Network; Evolved Universal Terrestrial Radio Access (E-UTRA); Physical layer procedures (Release 15).

Samsung, "Considerations on Sidelink CSI", R1-1901053, 3GPP TSG RAN WG1 Ad-Hoc Meeting 1901 Taipei, Taiwan, Jan. 21-25, 2019.

OPPO, "Discussion on Target Scenario for NR-V2X", R2-1816337, 3GPP TSG-RAN WG2 Meeting #104 Spokane, US. Nov. 12-16, 2018.

OPPO, "Discussion on Sidelink Unicast and Groupcast for NR-V2X", R2-1816339, 3GPP TSG-RAN WG2 Meeting #104 Spokane, US, Nov. 12-16, 2018.

International Search Report issued in corresponding International Application No. PCT/CN2019/075293, mailed Nov. 18, 2019, 29 pages.

PCT Written Opinion of the International Searching Authority issued in corresponding International Application No. PCT/CN2019/075293, mailed Nov. 18, 2019, 8 pages.

"Discussion on physical layer procedures in NR V2X", Agenda Item: 7.2.4.1.2, Source: CATT, 3GPP TSG RAN WG1 Ad-Hoc Meeting 1901, R1-1900321, Taipei, Jan. 21-25, 2019, 6 pages.

"Sidelink physical layer procedures for NR V2X", Agenda Item: 7.2.4.1.2, Source: Huawei, HiSilicon, 3GPP TSG RAN WG1 Ad-Hoc Meeting 1901, R1-1900023, Taipei, Jan. 21-25, 2019, 13 pages.

"Sidelink physical layer procedures for NR V2X communication", Agenda item: 7.2.4.1.2, Source: Intel Corporation, 3GPP TSG RAN WG1 Ad-Hoc Meeting 1901, R1-1900481, Taipei, Taiwan, Jan. 21-25, 2019, 17 pages.

"Discussion on physical layer procedure for NR V2X", Agenda Item: 7.2.4.1.2, Source: LG Electronics, 3GPP TSG RAN WG1 Meeting AH 1901, R1-1900648, Taipei, Taiwan , Jan. 21-25, 2019, 10 pages.

"On PHY procedures to support unicast and groupcast on NR sidelink", Agenda Item: 7.2.4.1.2, Source: Ericsson, 3GPP TSG RAN Wg 1 Meeting # ah-1901, R1-1901212, Taipei, Taiwan, Jan. 21-25, 2019, 10 pages.

"On Physical Layer Procedures for NR V2X", Agenda item: 7.2.4.1.2, Source: Samsung, 3GPP TSG RAN WG1 Ad-Hoc Meeting 1901, R1-1901048, Taipei, Taiwan, Jan. 21-25, 2019, 11 pages.

"Physical layer procedure for NR sidelink", Agenda Item: 7.2.4.1.2, Source: vivo, 3GPP TSG RAN WG1 Ad-Hoc Meeting 1901, R1-1900118, Taipei, Jan. 21-25, 2019, 9 pages.

"Physical Layer Procedures for NR V2X Sidelink", Agenda Item: 7.2.4.1.2, Source: InterDigital Inc., 3GPP TSG RAN WG1 Ad-Hoc Meeting 1901, R1-1900794, Taipei, Taiwan, Jan. 21-25, 2019, 8 pages.

"Sidelink physical layer procedure for NR V2X", Agenda Item: 7.2.4.1.2, Source: NTT Docomo, Inc., 3GPP TSG RAN WG1 Ad-Hoc Meeting 1901, R1-1900963, Taipei, Jan. 21-25, 2019, 9 pages.

Extended European Search Report issued in corresponding European Application No. 19915059.0, mailed Dec. 15, 2021, 15 pages.

"Remaining details on congestion control", Agenda item: 7.2.1.3, Source: Samsung, 3GPP TSG RAN WG1 #88, Rt-1702866, Athens, Greece Feb. 13-17, 2017, 4 pages.

First Office Action issued in corresponding Chinese Application No. 202111075169.X, mailed Mar. 25, 2022, 29 pages.

First Office Action issued in corresponding Indian Application No. 202127039805, mailed May 5, 2022, 6 pages.

Second Office Action issued in corresponding Chinese Application No. 202111075169.X, mailed Jun. 27, 2022, 11 pages.

First Office Action issued in corresponding European application No. 19915059.0, mailed Aug. 23, 2022.

LG Electronics, "Summary of email discussion [ 87-17 ] on the FFS points in the congestion control", R1-1703444, 3GPP TSG RAN WG1 Meeting #88 Athens, Greece Feb. 13-17, 2017.

First Office Action issued in corresponding Korean application No. 10-2021-7026306, mailed Jun. 29, 2023.

Notice of Allowance issued in corresponding Japanese application No. 2021-547280, mailed Sep. 8, 2023.

Extended European Search Report issued in corresponding European application No. 23186688.0, mailed Oct. 16, 2023.

Examination Report No. 1 for Standard Patent Application issued in Australian Application No. 2019429551, dated Aug. 20, 2024, 3 pages.

First Office action issued in corresponding Vietnamese Application No. 1-2021-05206, dated Aug. 30, 2024, 4 pages.

\* cited by examiner

300
A first device sends first indication information to a first terminal, the first indication information is used for indicating a first criterion, and the first criterion is used for the first terminal to determine a target transmission power for transmitting a first physical sidelink channel to a second terminal — S310
FIG. 4
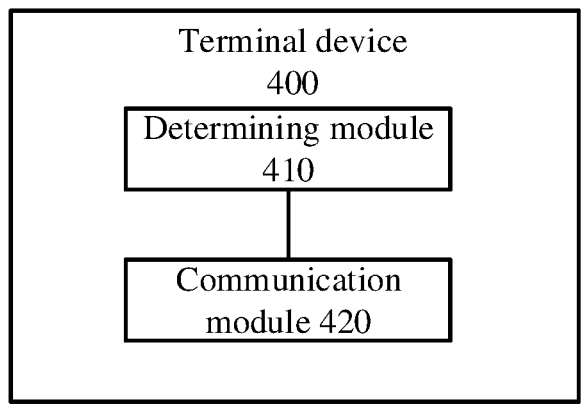
FIG. 5
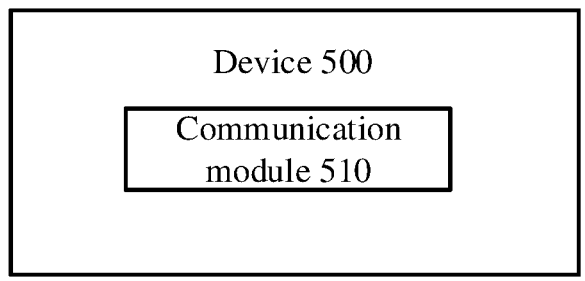
FIG. 6

METHOD AND APPARATUS FOR DERMINING TRANSMISSION POWER FOR SIDELINK CHANNEL

CROSS-REFERENCE TO RELATED APPLICATION

This application is a continuation of U.S. patent application Ser. No. 17/401,153, filed on Aug. 12, 2021, which is a continuation of International Application No. PCT/CN2019/075293, entitled "METHOD AND APPARATUS FOR WIRELESS COMMUNICATION", filed on Feb. 15, 2019, the entire contents of which are incorporated herein by reference in their entireties.

TECHNICAL FIELD

Embodiments of the present application relate to the field of communication technologies, and in particular to a method and apparatus for wireless communication.

BACKGROUND

A Long Term Evolution Vehicle to Everything (LTE-V2X) system is an Internet of Vehicles system based on sidelink transmission technology, and different from the traditional Long Term Evolution (LTE) data transmission method, it can employ terminal-to-terminal direct communication, and thus has higher spectrum efficiency and lower transmission delay.

In the LTE-V2X system, an uplink frequency band of a Frequency Division Duplex (FDD) system or an uplink subframe of a Time Division Duplex (TDD) system can be used for sidelink transmission, and accordingly, if one terminal performs sidelink transmission while another terminal performs uplink transmission at the same time, there will be mutual interference between the sidelink transmission and the uplink transmission. In order to avoid the interference on the uplink transmission by the sidelink transmission, an open-loop power control scheme is introduced, and a network device instructs the terminal to determine a transmission power for the sidelink transmission based on a path loss between the terminal and the network.

The New Radio Vehicle to Everything (NR-V2X) based system needs to support autonomous driving, and puts forward higher requirements for data interaction between vehicles, such as higher reliability requirements.

SUMMARY

The embodiments of the present application provide a wireless communication method and device capable of determining a transmission power for a sidelink channel according to a first criterion.

In a first aspect, a wireless communication method is provided, including: determining, by a first terminal according to a first criterion, a target transmission power for a first physical sidelink channel; and transmitting, by the first terminal, the first physical sidelink channel to a second terminal with the target transmission power.

In a second aspect, a wireless communication method is provided, including: sending, by a first device, first indication information to a first terminal, where the first indication information is used for indicating a first criterion that is used for the first terminal to determine a transmission power for transmitting a first physical sidelink channel to a second terminal.

In a third aspect, a wireless communication device is provided, which is used to perform the method in the foregoing first aspect or any possible implementation of the first aspect. Specifically, the device includes a unit for performing the method in the foregoing first aspect or any possible implementation of the first aspect.

In a fourth aspect, a wireless communication device is provided, which is used to perform the method in the foregoing second aspect or any possible implementation of the second aspect. Specifically, the device includes a unit for performing the method in the foregoing second aspect or any possible implementation of the second aspect.

In a fifth aspect, there is provided a wireless communication device including a processor and a memory. The memory is used for storing a computer program, and the processor is configured to call and run the computer program stored in the memory to perform the method in the foregoing first aspect or the implementations thereof.

In a sixth aspect, there is provided a wireless communication device including a processor and a memory. The memory is used for storing a computer program, and the processor is configured to call and run the computer program stored in the memory to perform the method in the foregoing second aspect or the implementations thereof.

In a seventh aspect, there is provided a chip which is used to carry out the method in any one of the above first to second aspects or the implementations thereof.

Specifically, the chip includes a processor configured to call and run a computer program from a memory, to cause a device installed with the chip to perform the method in any one of the above first to the second aspects or the implementations thereof.

In an eighth aspect, there is provided a computer-readable storage medium for storing a computer program that causes a computer to perform the method in any one of the above first to the second aspects or the implementations thereof.

In a ninth aspect, there is provided a computer program product including computer program instructions that cause a computer to perform the method in any one of the above first to the second aspects or the implementations thereof.

In a tenth aspect, there is provided a computer program which, when running on a computer, causes the computer to perform the method in any one of the above first to the second aspects or the implementations thereof.

BRIEF DESCRIPTION OF THE DRAWINGS

FIG. 4 is a schematic diagram of a wireless communication method according to an embodiment of the present application.

FIG. 5 is a schematic block diagram of a wireless communication device according to an embodiment of the present application.

FIG. 6 is a schematic block diagram of a wireless communication device according to an embodiment of the present application.

DETAILED DESCRIPTION

The technical solutions in the embodiments of the present application will be described below in connection with the drawings in the embodiments of the present application. Obviously, the described embodiments are part of the embodiments of the present application, but not all the embodiments. All other embodiments obtained by those of ordinary skill in the art based on the embodiments in the present application without creative work fall within the protection scope of the present application.

It should be understood that the technical solutions of the embodiments of the present application can be applied to a Device to Device (D2D) communication system, for example, an Internet of Vehicles (IoV) system that performs D2D communication based on Long Term Evolution (LTE), or a NR-V2X system. Unlike the traditional LTE system in which communication data between terminals is received or sent through a network device (for example, a base station), the IoV system adopts terminal-to-terminal direct communication, and thus has higher spectrum efficiency and lower transmission delay.

Optionally, the communication system on which the IoV system is based can be a Global System of Mobile communication (GSM) system, a Code Division Multiple Access (CDMA) system, a Wideband Code Division Multiple Access (WCDMA) system, a General Packet Radio Service (GPRS), a LTE system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system and a 5G new radio (NR) system, among others.

The terminal device in the embodiments of the present application can be a terminal device capable of implementing D2D communication. For example, it may be a vehicle-mounted terminal device, a terminal device in a 5G network, a terminal device in a future evolution Public Land Mobile Network (PLMN) or the like, which is not limited in the embodiments of the present application.

Figure 1:
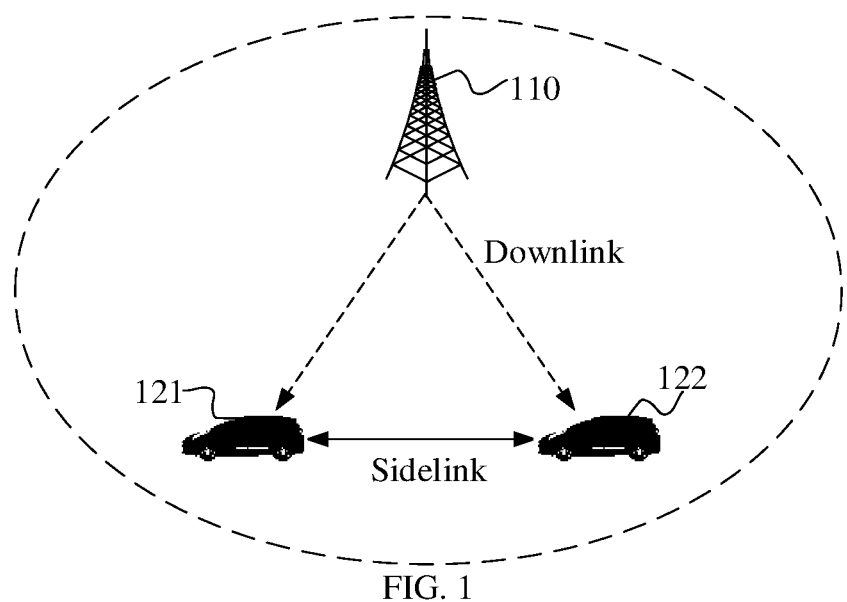
FIG. 1 is a schematic diagram of a communication system architecture according to an embodiment of the present application.

FIG. 1 is schematic diagram of an application scenario of an embodiment of the present application. FIG. 1 exemplarily shows one network device and two terminal devices. Optionally, the wireless communication system in an embodiment of the present application can include a plurality of network devices, and other numbers of terminal devices can be included in the coverage of each network device, which is not limited in the embodiments of the present application.

Optionally, the wireless communication system may also include other network entities such as a Mobile Management Entity (MME), a Serving Gateway (S-GW), a Packet Data Network Gateway (P-GW), etc., or the wireless communication system may also include other network entities such as Session Management Function (SMF), Unified Data Management (UDM), Authentication Server Function (AUSF), etc., which is not limited in the embodiments of the present application.

In the IoV system, the terminal device can use mode 3 and mode 4 to perform communication.

Specifically, the terminal devices 121 and 122 may communicate in a D2D communication mode. When performing the D2D communication, the terminal devices 121 and 122 directly communicate through a D2D link, that is, a Side-Link (SL). In mode 3, transmission resources of the terminal device are assigned by the base station, and the terminal device can send data on the SL according to the resources assigned by the base station. The base station can assign resources for a single transmission for the terminal device, or can assign semi-persistent transmission resources for the terminal. In mode 4, the terminal device adopts a transmission mode of sensing plus reservation, and the terminal device autonomously selects transmission resources on the SL resources. Specifically, the terminal device obtains a set of available transmission resources from a resource pool by means of sensing, and randomly selects a resource from the set of available transmission resources for data transmission.

It should be understood that the above mode 3 and mode 4 are merely illustrative of the two transmission modes, and other transmission modes may be defined. For example, mode 1 and mode 2 are introduced in NR-V2X. Mode 1 represents that the sidelink transmission resources of the terminal device are assigned by the base station, and mode 2 represents that the sidelink transmission resources of the terminal device are selected by the terminal.

The D2D communication can refer to Vehicle to Vehicle (V2V) communication or Vehicle to Everything (V2X) communication. In V2X communication, X can generally stand for any device with wireless receiving and transmitting capabilities, such as, but is not limited to, a slowly-moving wireless apparatus, a fast-moving in-vehicle device, or a network control node with wireless transmitting and receiving capabilities. It should be understood that the embodiments of the present application are mainly applied to V2X communication scenarios, but can also be applied to any other D2D communication scenario, which is not limited in the embodiments of the present application.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "I" used herein generally indicates that the related objects before and after this character are in an "or" relationship.

Figure 2:
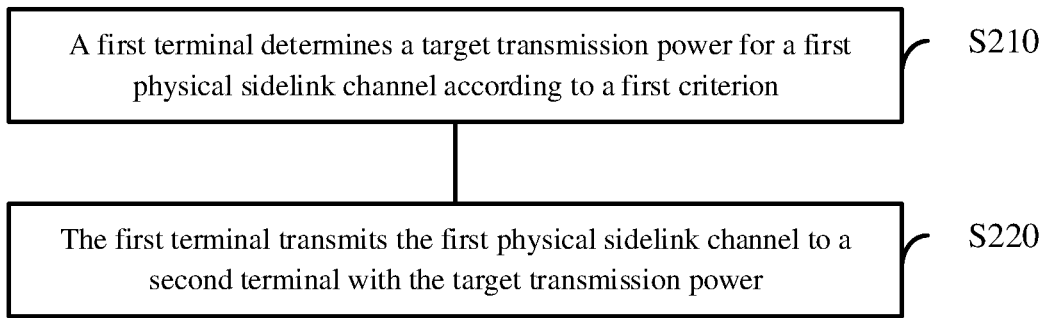
FIG. 2 is a schematic diagram of a wireless communication method according to an embodiment of the present application.

FIG. 2 is a schematic flowchart of a wireless communication method according to an embodiment of the present application. The method can be performed by a terminal device in the Internet of Vehicles system, such as the terminal device 121 or the terminal device 122. As shown in FIG. 2, the method 200 include:

S210, a first terminal determines a target transmission power for a first physical sidelink channel according to a first criterion; and S220, the first terminal transmits the first physical sidelink channel to a second terminal with the target transmission power.

Optionally, in an embodiment of the application, the first physical sidelink channel may be a sidelink channel used for communication between the terminals, such as a Physical Sidelink Broadcast Channel (PSBCH), a Physical Sidelink Feedback Channel (PSFCH), a Physical Sidelink Shared Channel (PSSCH), a Physical Sidelink Control Channel (PSCCH) or the like.

Optionally, in an embodiment of the present application, the first criterion is used for indicating a manner of determining the transmission power for the sidelink channel that is used for communication between the terminals. For example, the first criterion may indicate that the transmission power is determined according to a path loss, or that the transmission power is determined according to attributes of sidelink data to be transmitted (for example, a priority, reliability, etc.), or the transmission power is determined according to the interference on the uplink transmission by the sidelink transmission, etc.

Optionally, in some embodiments, the first criterion is used for indicating at least one of the following:

determining the target transmission power according to a maximum transmission power of the terminal device, denoted as manner 1;

determining the target transmission power according to first configuration information, denoted as manner 2;

determining the target transmission power according to a first transmission power, where the first transmission power is determined according to a first path loss, and the first path loss is a path loss between the first terminal and a network device, denoted as manner 3;

determining the target transmission power according to a second transmission power, where the first transmission power is determined according to a second path loss, and the second path loss is a path loss between the first terminal and the second terminal, denoted as manner 4;

determining the target transmission power according to the first path loss, where the first path loss is the path loss between the first terminal and the network device, denoted as manner 5;

determining the target transmission power according to the second path loss, where the second path loss is the path loss between the first terminal and the second terminal, denoted as manner 6;

determining the target transmission power according to a minimum of the first transmission power and the second transmission power, denoted as manner 7;

determining the target transmission power according to a maximum of the first transmission power and the second transmission power, denoted as manner 8;

determining the target transmission power according to a first attribute of the sidelink data to be transmitted and a first threshold, denoted as manner 9; and determining the target transmission power according to a type of the first physical sidelink channel, denoted as manner 10.

Optionally, in some embodiments, the first criterion may be determined by the first terminal by itself, that is, the first terminal may decide by itself to determine the transmission power for the first physical sidelink channel according to information such as the first path loss, the second path loss, or the attributes of the sidelink data to be transmitted, which is beneficial to ensure the transmission requirements for the sidelink transmission such as the reliability and the delay.

Optionally, in some other embodiments, the first criterion may be configured by a network device.

For example, the network device may send first indication information to the first terminal, and indicate the first criterion through the first indication information. Optionally, the first indication information may be carried in Downlink Control Information (DCI), downlink broadcast information, Radio Resource Control (RRC) signaling, or other downlink information or downlink channels.

For example, the network device configures, through the first criterion, the first terminal to determine the transmission power for the physical sidelink channel based on information such as the first path loss, the second path loss or the attributes of the sidelink data, which can control the interference on the uplink channel by the sidelink channel.

Optionally, in some other embodiments, the first criterion is configured by a third terminal, where the third terminal is a group head terminal of a communication group in which the first terminal is located.

It should be understood that, in an embodiment of the present application, the group head terminal may be a terminal with at least one of the following functions: group management, maintenance, joining of a new group member, withdrawal of a group member, resource management, resource allocation, resource coordination, etc.

Optionally, the third terminal may send configuration information to the first terminal, and indicate the first criterion through the configuration information. Optionally, the configuration information is carried in Sidelink Control Information (SCI), Sidelink RRC (S-RRC) signaling, or other sidelink information or sidelink channels.

In an embodiment of the present application, the group head terminal controls the transmission power of the terminals in the group through the first criterion, so as to ensure the reliability and delay requirements for the communication between the terminals in the group, which is suitable for scenarios with higher reliability and delay requirements such as vehicle formation.

Optionally, as another embodiment, the first criterion is pre-configured. For example, the first criterion is defined by a protocol, and the first criterion defined by the protocol may be configured for the first terminal. Accordingly, the first terminal may determine the transmission power for the first physical sidelink channel according to the first criterion that is pre-configured.

Hereinafter, specific implementations of the above-mentioned manners 1 to 10 will be described in detail.

Manner 1:

If the first criterion indicates that the target transmission power is determined according to the manner 1, the first terminal may determine a maximum transmission power of the first terminal as the target transmission power for the first physical sidelink channel. It should be understood that the maximum transmission power of the first terminal here may be pre-configured, for example, 23 dBm.

Manner 2:

If the first criterion indicates that the target transmission power is determined according to the manner 2, the first terminal may determine the target transmission power for the first physical sidelink channel according to first configuration information.

Optionally, the first configuration information may include a first mapping relationship, and for example, the first mapping relationship may be a mapping relationship between a maximum transmission power and at least one of priority information and a Channel Busy Ratio (CBR), so that the first terminal can determine the maximum transmission power according to the priority information of the sidelink data to be transmitted and/or the CBR of the current channel in combination with the first mapping relationship, where the maximum transmission power here is a maximum transmission power determined based on the first configuration information. Further, the first terminal may determine the target transmission power for transmitting the first physical sidelink channel according to the maximum transmission power determined based on the first configuration information. For example, the maximum transmission power may be determined as the target transmission power for transmitting the first physical sidelink channel.

For example, the first mapping relationship may be as shown in Table 1:

TABLE 1

| CBR | Priority | Maximum transmission power (dBm) |
|---|---|---|
| 0 <= CBR < 0.3 | 0 | 23 |
|  | 1 | 22 |
|  | 2 | 20 |
|  | 3 | 18 |
| 0.3 <= CBR < 0.6 | 0 | 22 |
|  | 1 | 20 |
|  | 2 | 18 |
|  | 3 | 16 |
| 0.6 <= CBR | 0 | 20 |
|  | 1 | 18 |
|  | 2 | 16 |
|  | 3 | 15 |

It should be understood that the lower a value of the priority is, the higher the priority is. That is, a level of priority 0 is higher than that of priority 1 or 2.

If the priority of the sidelink data to be transmitted is 1, when the CBR of the current channel is 0.8, the maximum transmission power can be determined to be 18 dBm from Table 1, and the target transmission power for the first physical sidelink channel can be further determined to be 18 dBm.

It can be understood that the smaller the CBR is, the fewer the channels are currently transmitted, and the higher the priority is, the more it is necessary to ensure the prioritized transmission of the data. Therefore, in an embodiment of the present application, it can be configured such that the higher the priority of the sidelink data to be transmitted is and the smaller the CBR is, the larger the corresponding maximum transmission power is, which can ensure the reliable transmission of the sidelink data with higher priority without causing much interference to the transmission of other channels.

It should be understood that, in an embodiment of the present application, the first mapping relationship may also be a mapping relationship between other attributes of the data to be transmitted and the maximum transmission power. For example, the first mapping relationship may be a mapping relationship between the attributes such as Quality of Service (QoS), reliability or delay, the CBR, and the maximum transmission power, and the embodiments of the present application are not limited thereto.

Manner 3:

If the first criterion indicates transmitting the physical sidelink channel with the transmission power determined in the manner 3, the first terminal may determine the first transmission power according to the first path loss between the first terminal and the network device. Further, the first terminal may determine the target transmission power for the first physical sidelink channel according to the first transmission power.

For example, a minimum of the first transmission power $P_1$ and the maximum transmission power $P_{CMAX}$ of the first terminal is determined as the target transmission power P for the first physical sidelink channel, that is, $P=\min\{P_{CMAX}, P_1\}$, where the first transmission power $P_1$ is determined according to the first path loss.

For another example, the first terminal may also determine a minimum of the following: the first transmission power; the maximum transmission power of the first terminal device; and a maximum transmission power determined according to second configuration information, as the target transmission power for the first physical sidelink channel. The second configuration information may be, for example, the first configuration information in the manner 2, or other configuration information. The second configuration information may be configured by a network device, may be pre-configured, or may be configured by a group head terminal.

Optionally, in some embodiments, the first terminal may also determine the first transmission power as the target transmission power for the first physical sidelink channel.

For example, if the first transmission power is determined according to the first path loss and in consideration of limitation of the maximum transmission power of the first terminal, for example, the minimum of the transmission power determined according to the first path loss and the maximum transmission power of the first terminal can be determined as the first transmission power, and in this case, the first terminal may directly determine the first transmission power as the target transmission power for the first physical sidelink channel.

Optionally, the first path loss can be determined through measurement of a reference signal sent by the network device. For example, the first terminal can measure a downlink channel or downlink signal sent by the network device, and then determine the first path loss according to the transmission power of the downlink channel or downlink signal.

Manner 4:

If the first criterion indicates transmitting the physical sidelink channel with the transmission power determined in the manner 4, the first terminal may determine a second transmission power according to a second path loss between the first terminal and the second terminal device. Further, the first terminal may determine the target transmission power for the first physical sidelink channel according to the second transmission power.

For example, a minimum of the second transmission power $P_2$ and the maximum transmission power $P_{CMAX}$ of the first terminal device is determined as the target transmission power P for the first physical sidelink channel, that is, $P=\min\{P_{CMAX}, P_2\}$, where the second transmission power $P_2$ is determined according to the second path loss.

For another example, the first terminal may also determine the minimum of the following: the second transmission power; the maximum transmission power of the first terminal device; and a maximum transmission power determined according to third configuration information, as the target transmission power for the first physical sidelink channel. The third configuration information may be, for example, the first configuration information in the manner 2, or other configuration information. Optionally, the third configuration information may be configured by a network device, may be pre-configured, or may be configured by the group head terminal.

Optionally, the first terminal determines the second transmission power as the target transmission power for the first physical sidelink channel.

For example, if the second transmission power is determined according to the second path loss and in consideration of the limitation of the maximum transmission power of the first terminal, for example, the minimum of the transmission power determined according to the second path loss and the maximum transmission power of the first terminal can be determined as the second transmission power, and in this case, the first terminal may directly determine the second transmission power as the target transmission power for the first physical sidelink channel.

Optionally, the second path loss can be obtained through measurement and/or feedback of the sidelink channel. For example, the first terminal sends a sidelink reference signal, and the second terminal measures a Sidelink Reference Signal Receiving Power (S-RSRP) from the sidelink reference signal, and feeds back the S-RSRP to the first terminal, so that the first terminal can determine the second path loss; or the first terminal measures a sidelink channel or a sidelink signal sent by the second terminal, and can further determine the second path loss according to the transmission power of the sidelink channel or the sidelink signal.

Manner 5:

If the first criterion indicates that the target transmission power is determined according to the manner 5, the first terminal may determine the first transmission power according to the first path loss between the first terminal and the network device.

Optionally, the first terminal may determine the target transmission power for the first physical sidelink channel according to the first transmission power.

For example, a minimum of the first transmission power and the maximum transmission power of the first terminal device is determined as the target transmission power for the first physical sidelink channel.

For another example, the first terminal may also determine the first transmission power as the target transmission power for the first physical sidelink channel.

For another example, the first terminal may also determine a minimum of the following: the first transmission power; the maximum transmission power of the first terminal device; and a maximum transmission power determined according to fourth configuration information, as the target transmission power for the first physical sidelink channel. The fourth configuration information may be, for example, the first configuration information in the manner 2, or other configuration information. The fourth configuration information may be configured by the network device, may be pre-configured, or may be configured by the group head terminal.

Optionally, as for the method for determining the first path loss, reference can be made to the foregoing related description, which will not be repeated here.

Manner 6:

If the first criterion indicates that the target transmission power is determined according to the manner 6, the first terminal may determine the second transmission power according to the second path loss between the first terminal and the second terminal.

Optionally, the first terminal may determine the target transmission power for the first physical sidelink channel according to the second transmission power.

For example, a minimum of the second transmission power and the maximum transmission power of the first terminal device is determined as the target transmission power for the first physical sidelink channel.

For another example, the first terminal may also determine the second transmission power as the target transmission power for the first physical sidelink channel.

For another example, the first terminal may also determine a minimum of the following: the second transmission power; the maximum transmission power of the first terminal device; and a maximum transmission power determined according to fifth configuration information, as the target transmission power for the first physical sidelink channel. The fifth configuration information may be, for example, the first configuration information in the manner 2, or other network configured information. The fifth configuration information may be configured by the network device, may be pre-configured, or may be configured by the group head terminal.

Optionally, as for the method for determining the second path loss, reference can be made to the foregoing related description, which will not be repeated here.

Optionally, in an embodiment of the present application, the network device may instruct, through the first criterion, the first terminal to use the transmission power determined in the manner 3 or 4, or in the manner 5 or 6 to transmit the physical sidelink channel when certain conditions are met.

For example, the network device may determine the first criterion according to a first attribute of the data to be transmitted. As an example but not a limitation, the first attribute may include at least one of the following:

a priority, reliability, delay, a transmission rate, a throughput, a transmission distance or communication distance, QoS, a 5G QoS Indicator (5QI), and a V2X QoS Indicator (VQI).

Taking the priority as the first attribute as an example, the network device may instruct the first terminal to transmit the physical sidelink channel with the transmission power determined in the manner 4 or manner 6 when the priority of the data to be transmitted is high (for example, a value of the priority is less than a first threshold), or instruct the first terminal to transmit the physical sidelink channel with the transmission power determined in the manner 3 or manner 5 when the priority of the data to be transmitted is low (for example, the value of the priority is greater than or equal to the first threshold).

Generally, with the above power control method, the first terminal can be instructed to determine the target transmission power according to the second path loss when the priority of the sidelink data is high so as to first guarantee the normal transmission of the sidelink data, and when the priority of the sidelink data is low, the first terminal is instructed to determine the target transmission power according to the first path loss, and transmit the sidelink channel with the target transmission power, which can reduce the interference on the uplink transmission by the sidelink transmission.

Similarly, the first terminal can also choose by itself different determination manners to determine the target transmission power for the physical sidelink channel when certain conditions are met. For example, the first terminal can also select to transmit the physical sidelink channel with the transmission power determined in the manner 4 or manner 6 in a case where the priority of the sidelink data to be transmitted is high, or select to transmit the physical sidelink channel with the transmission power determined in the manner 3 or manner 5 in a case where the priority of the sidelink data to be transmitted is low.

Alternatively, the first terminal can also be pre-configured to select different determination manners for determining the target transmission power for the physical sidelink channel under different conditions. For example, the first terminal can be configured to select the transmission power determined in the manner 4 or manner 6 for transmitting the physical sidelink channel in the case where the priority of the sidelink data to be transmitted is high, and can be configured to select the transmission power determined in the manner 3 or manner 5 for transmitting the physical sidelink channel in the case where the priority of the sidelink data to be transmitted is low.

Manner 7:

If the first criterion indicates determining the target transmission power according to the manner 7, the first terminal may determine the target transmission power according to a minimum of the first transmission power and the second transmission power.

In an implementation, the first terminal can directly determine a minimum of the first transmission power and the second transmission power as the target transmission power, that is, P=min (P$_1$, P$_2$), where P is the target transmission power, P1 is the first transmission power, and P2 is the second transmission power.

For example, the first terminal device has taken into account the limitation of the maximum transmission power of the first terminal when calculating P1 according to the first path loss, and has taken into account the limitation of the maximum transmission power of the first terminal when calculating P2 according to the second path loss, and in this case, the first terminal may select the minimum of P1 and P2 as the target transmission power.

Alternatively, the first terminal can determine a minimum of the following: the first transmission power; the second transmission power; and the maximum transmission power of the first terminal in the manner 1, and determine the minimum as the target transmission power, that is, P=min [P$_{cmax}$, min (P$_1$, P$_2$)], where P is the target transmission power, P1 is the first transmission power, P2 is the second transmission power, and Pcmax is the maximum transmission power of the first terminal referred to in the manner 1.

For example, the first terminal determines P1 according to the first path loss, and determines P2 according to the second path loss, and in this case, the first terminal may select the minimum of P1, P2 and the maximum transmission power of the first terminal, as the target transmission power.

Alternatively, the first terminal can determine a minimum of the following: the first transmission power; the second transmission power; the maximum transmission power of the first terminal in the manner 1; and a maximum transmission power determined according to sixth configuration information, and determine the minimum as the target transmission power. For example, the sixth configuration information is the first configuration information in the manner 2, and in this case, the target transmission power is: P=min[P$_{cmax}$,P$_{max\text{-}CBR}$, min (P$_1$, P$_2$)], where P is the target transmission power, P1 is the first transmission power, P2 is the second transmission power, Pcmax is the maximum transmission power of the first terminal referred to in the manner 1, and Pmax-CBR is the maximum transmission power determined according to the manner 2.

Optionally, the sixth configuration information may also be other configuration information, which is not limited in the embodiments of the present application.

Optionally, the sixth configuration information may be configured by the network, may be pre-configured, or may be configured by the group head terminal.

It should be understood that, in this manner 7, as for the methods for determining the first transmission power and the second transmission power, reference can be made to the related description of the foregoing embodiments, which will not be repeated here.

Optionally, when certain conditions are met, the first criterion indicates using the manner 7 to determine the transmission power for the physical sidelink channel. For example, when the priority of the sidelink data to be transmitted is low, or the reliability requirement is low, the first criterion may indicate determining the transmission power for the physical sidelink channel with the minimum of the first transmission power and the second transmission power, so as to reduce the interference on the uplink channel by the sidelink channel.

Manner 8:

If the first criterion indicates determining the target transmission power according to the manner 8, the first terminal may determine the target transmission power according to a maximum of the first transmission power and the second transmission power.

In an implementation, the first terminal can directly determine a maximum of the first transmission power and the second transmission power as the target transmission power, that is, P=max (P$_1$, P$_2$), where P is the target transmission power, P1 is the first transmission power, and P2 is the second transmission power.

For example, the first terminal device has taken into account the limitation of the maximum transmission power of the first terminal when calculating P1 according to the first path loss, and has also taken into account the limitation of the maximum transmission power of the first terminal when calculating P2 according to the second path loss, and in this case, the first terminal may select the maximum of P1 and P2 as the target transmission power.

Alternatively, the first terminal can also determine a maximum of the first transmission power and the second transmission power, determine a minimum of this maximum and the maximum transmission power of the first terminal in the manner 1, and determine this minimum as the target transmission power, that is, P=min[P$_{cmax}$, max (P$_1$, P$_2$)], where P is the target transmission power, P1 is the first transmission power, P2 is the second transmission power, and Pcmax is the maximum transmission power of the first terminal referred to in the manner 1.

For example, the first terminal determines P1 according to the first path loss, and determines P2 according to the second path loss. In this case, the first terminal can select the maximum of P1 and P2 to be compared with the maximum transmission power of the first terminal, and determine a minimum of this maximum and the maximum transmission power of the first terminal as the target transmission power.

Alternatively, the first terminal can also determine a maximum of the first transmission power and the second transmission power, determine a minimum of the following: this maximum; the maximum transmission power of the first terminal in the manner 1; and a maximum transmission power determined according to seventh configuration, and determine this minimum as the target transmission power. For example, the seventh configuration information is the first configuration information in the manner 2, and in this case, the target transmission power is: P=min[P$_{cmax}$,P$_{max\text{-}CBR}$, max (P$_1$, P$_2$)], where P is the target transmission power, P1 is the first transmission power, P2 is the second transmission power, Pcmax is the maximum transmission power of the first terminal referred to in the manner 1, and Pmax-CBR is the maximum transmission power determined according to the manner 2.

Optionally, the seventh configuration information may also be other configuration information, which is not limited in the embodiments of the present application.

Optionally, the seventh configuration information may be configured by the network, or may be pre-configured, or may be configured by the group head terminal.

It should be understood that, in this manner 8, as for the methods for determining the first transmission power and the second transmission power, reference can be made to the related description of the foregoing embodiments, which will not be repeated here.

Optionally, when certain conditions are met, the first criterion can indicates using the manner 8 to determine the transmission power for the physical sidelink channel. For example, when the priority of the sidelink data to be transmitted is high, or the reliability requirement is high, the first criterion may indicate using the maximum of the first transmission power and the second transmission power to determine the transmission power, so as to ensure the reliability and delay requirements of the sidelink channel transmission.

Manner 9:

If the first criterion indicates determining the target transmission power according to the manner 9, the first terminal can determine the target transmission power according to a first threshold and a first attribute of the sidelink data to be transmitted.

Optionally, the first threshold may be pre-configured, or configured by the network, or configured by the group head terminal.

As an example but not a limitation, the first attribute may include at least one of the following:

a priority, reliability, delay, a transmission rate, a throughput, a transmission distance or communication distance, QoS, a 5G QoS Indicator (5QI), and a V2X QoS Indicator (VQI).

Correspondingly, the first threshold may be at least one of the following:

a priority threshold, a reliability threshold, a delay threshold, a transmission rate threshold, a throughput threshold, a transmission distance threshold, a 5QI threshold and a VQI threshold.

For example, in a case where the first attribute is the priority, the first threshold is the priority threshold. If the priority of the sidelink data to be transmitted is less than or equal to the first threshold, that is, the priority of the sidelink data to be transmitted is high, the first terminal may determine the target transmission power according to the second path loss, and transmit the first physical sidelink channel with the target transmission power; or if the value of the priority of the sidelink data to be transmitted is greater than the first threshold, the priority of the sidelink data to be transmitted is low, and the first terminal may determine the target transmission power according to the first path loss, and transmit the first physical sidelink channel with the target transmission power. In this way, on the one hand, reliable transmission of the sidelink data with high priority can be ensured, and on the other hand, the interference on uplink transmission by the sidelink transmission with low priority can be reduced.

For another example, the first attribute is the reliability, and in this case, the first threshold is the reliability threshold. If the reliability requirement of the sidelink data to be transmitted is less than, or less than or equal to the first threshold (for example, 90% or 95%), the first terminal may determine the target transmission power according to the first path loss, and transmit the first physical sidelink channel with the target transmission power; or if the reliability requirement of the sidelink data to be transmitted is higher than the first threshold, the first terminal may determine the target transmission power according to the second path loss, and transmit the first physical sidelink channel with the target transmission power. In this way, on the one hand, reliable transmission of the sidelink data with high reliability requirements can be ensured, and on the other hand, the interference on the uplink transmission by the sidelink transmission with low reliability requirements can be reduced.

Optionally, in some other embodiments, the first terminal may determine the target transmission power according to the first threshold and the first attribute of the sidelink data to be transmitted, or the first terminal may determine the target transmission power according to the first threshold, the first attribute of the sidelink data to be transmitted and the maximum transmission power of the first terminal.

Manner 10:

If the first criterion indicates determining the target transmission power according to the manner 10, the first terminal may determine the target transmission power according to a type of the first physical sidelink channel.

For example, if the first physical sidelink channel is a PSBCH, PSCCH, or PSFCH, the first terminal may determine to determine the target transmission power according to the second path loss, and transmit the first physical sidelink channel with the target transmission power. Generally, the reliability or importance of the PSBCH, PSCCH and PSFCH are higher, by transmitting such type of sidelink channels with the transmission power determined according to the second path loss, it is beneficial to ensure the reliability and delay requirements of the transmission of such type of sidelink channels.

For another example, if the first physical sidelink channel is the PSSCH, the first terminal may determine to determine the target transmission power according to the first path loss, and transmit the first physical sidelink channel with the target transmission power. Generally, the reliability or importance of the PSSCH is relatively low, and by transmitting such type of sidelink channel with the transmission power determined according to the first path loss, it is beneficial to avoid interference on the uplink transmission by the sidelink transmission.

It should be understood that the target transmission power of the first terminal cannot exceed the maximum transmission power of the first terminal. That is, the target transmission power calculated according to the above implementations should be limited by the maximum transmission power of the first terminal.

It should be understood that if the maximum transmission power can be determined according to protocol predefined or network configured information, the target transmission power of the first terminal cannot exceed the maximum transmission power. That is, the target transmission power calculated according to the foregoing implementations should be limited by the maximum transmission power. For example, according to the first configuration information in the manner 2 and in combination with the priority of the data to be transmitted and the CBR, it is determined that the maximum transmission power is 20 dBm, and the target transmission power determined in the foregoing implementations needs to be less than, or less than or equal to 20 dBm.

It should be understood that the above description is given only in the example where the first terminal transmits only one sidelink channel at a time, and in some other embodiments, the first terminal may also transmit multiple sidelink channels at the same time (case 1). For example, while transmitting the first physical sidelink channel to the second terminal, the first terminal can also transmit a third physical sidelink channel to another terminal, such as a fourth terminal, or transmits a fourth physical sidelink channel to a fifth terminal. Alternatively, the terminal device may also send an uplink channel to the network device while transmitting the sidelink channel (case 2), which is not limited in the embodiments of the present application.

For case 1, the first terminal may also determine the target transmission power for transmitting the third physical sidelink channel or the fourth physical sidelink channel according to the methods described in the foregoing manner 1 to manner 10, which will not be described in detail here.

For example, the first terminal can determine a third transmission power according to a third path loss between the first terminal and the third terminal, and further, in the manner 7, the first terminal can determine the target transmission power based on a minimum of the following: the first transmission power; the second transmission power; and the third transmission power, and for example, determine a minimum of the following: the first transmission power; the second transmission power; the third transmission power; the maximum transmission power of the first terminal; and the maximum transmission power determined according to the manner 2, as the target transmission power, that is, $P=\min[P_{cmax}, P_{max\text{-}CBR}, \min(P_1, P_2, P_3)]$.

For case 2, the first terminal may determine the transmission power for the first physical sidelink channel according to the attribute of the sidelink data to be transmitted. For the attribute of the sidelink data here, reference can be made to the first attribute mentioned above, which will not be repeated here.

Taking the priority as an example, when the value of the priority of the sidelink data to be transmitted is less than, or less than or equal to a third threshold, the first terminal may determine to transmit only the first physical sidelink channel, for example, transmit the first physical sidelink channel with the maximum transmission power of the first terminal, or to transmit the first physical sidelink channel with the second transmission power as described above; or the first terminal may also determine to first guarantee the transmission power for the first physical sidelink channel, and transmit the uplink channel with remaining power when there is the remaining power in the transmission power of the first terminal. For example, the first terminal transmits the first physical sidelink channel with the second transmission power, and if the second transmission power is less than the maximum transmission power of the first terminal, the remaining power is used as the transmission power for the uplink channel.

Alternatively, when the value of the priority of the sidelink data to be transmitted is greater than, or greater than or equal to the third threshold, the first terminal may determine to transmit only the uplink channel, for example, transmit the uplink channel with the maximum transmission power of the first terminal, or transmit the uplink channel with the first transmission power as described above; or the first terminal may also determine to first guarantee the transmission power for the uplink channel, and transmit the first physical sidelink channel with remaining power when there is the remaining power in the transmission power of the first terminal. For example, the first terminal transmits the uplink channel with the first transmission power, and if the first transmission power is less than the maximum transmission power of the first terminal, the remaining power is used as the transmission power for the first physical sidelink channel.

Optionally, in an embodiment of the present application, the method 200 further includes:

the first terminal determines a target transmission power for a second physical sidelink channel according to the target transmission power for the first physical sidelink channel and a second criterion.

In this embodiment, the transmission powers for the first physical sidelink channel and the second physical sidelink channel have a certain relationship, and the second criterion is used for indicating the relationship between the transmission power for the first physical sidelink channel and the transmission power for the second physical sidelink channel That is, after the transmission power for the first physical sidelink channel is determined according to the aforementioned first criterion, the target transmission power for the second physical sidelink channel can be determined in combination with the second criterion.

Optionally, the first physical sidelink channel is a PSSCH, and the second physical sidelink channel is a PSCCH or PSFCH; or the first physical sidelink channel is a PSBCH, and the second physical sidelink channel is the PSCCH or PSSCH.

Optionally, in an embodiment of the present application, the second criterion may be pre-configured; or the second criterion is configured by the network device; or the second criterion is configured by a third terminal, where the third terminal is a group head terminal of a communication group where the first terminal is located.

For the specific configuration method, reference can be made to the configuration method of the first criterion in the foregoing embodiments, which will not be repeated here.

Optionally, in some embodiments, the second criterion includes at least one of the following:

the transmission power for the second physical sidelink channel is the same as the transmission power for the first physical sidelink channel, denoted as relationship 1;

there is a first difference between the transmission power for the second physical sidelink channel and the transmission power for the first physical sidelink channel, denoted as relationship 2;

a power spectral density (PSD) for the second physical sidelink channel is the same as the power spectral density for the first physical sidelink channel, which is denoted as relationship 3;

there is a second difference between the power spectral density for the second physical sidelink channel and the power spectral density for the first physical sidelink channel, denoted as relationship 4;

a ratio of the power spectral density for the second physical sidelink channel to the power spectral density for the first physical sidelink channel is a first ratio, denoted as relationship 5.

For relationship 1, the first terminal may determine the transmission power for the first physical sidelink channel as the transmission power for the second physical sidelink channel.

For relationship 2, the first terminal may determine the transmission power for the first physical sidelink channel plus a power value of the first difference as the transmission power for the second physical sidelink channel, that is, $P'=P+A\text{dB}$, where P is the transmission power for the first physical sidelink channel, P' is the transmission power for the second physical sidelink channel, and AdB is the first difference.

Optionally, A may be pre-configured, or may be configured by a network device, or may be configured by a group head terminal.

For relationship 3, the first terminal may determine the power spectrum density for the first physical sidelink channel as the power spectrum density for the second physical sidelink channel, and then determine the transmission power for the second physical sidelink channel according to the power spectrum density for the second physical sidelink channel and a frequency domain resource size of the second physical sidelink channel. Specifically, the transmission power for the second physical sidelink channel may be determined according to the frequency domain resources occupied by the second physical sidelink channel and the power spectral density for the first physical sidelink channel.

For relationship 4, the first terminal may determine the power spectral density PSD1 for the first physical sidelink channel plus the second difference B as the power spectral density PSD2 for the second physical sidelink channel, that is, PSD2=PSD1+B, and then determine the transmission power for the second physical sidelink channel according to the power spectral density for the second physical sidelink channel and the frequency domain resource size of the second physical sidelink channel.

Optionally, the second difference B may be pre-configured, or may be configured by the network device, or may be configured by the group head terminal.

For relationship 5, the first terminal may determine a power spectral density obtained by multiplying the power spectral density PSD1 for the first physical sidelink channel by the first ratio C, as the power spectral density PSD2 for the second physical sidelink channel, that is, PSD2=PSD1*C, and then determine the transmission power for the second physical sidelink channel according to the power spectral density for the second physical sidelink channel and the frequency domain resource size of the second physical sidelink channel.

Optionally, the first ratio C may be pre-configured, or may be configured by the network device, or may be configured by the group head terminal.

Figure 3:
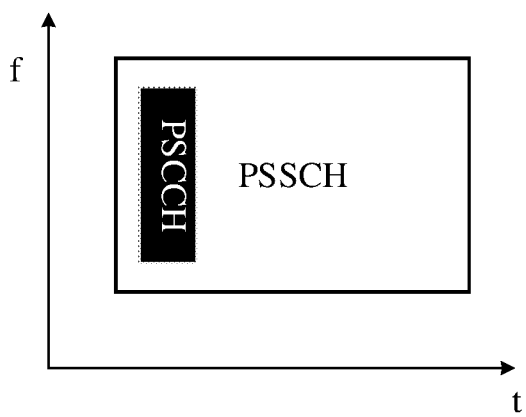
FIG. 3 is a schematic diagram of a manner for determining a transmission power for PSCCH and PSSCH.

Description is given in an example where the first physical sidelink channel is the PSSCH and the second physical sidelink channel is the PSCCH. As shown in FIG. 3, assuming that the transmission time of PSCCH overlaps the transmission time of PSSCH partly in a time unit, the transmission power for the PSSCH can be determined according to the first criterion in the above embodiments, and this transmission power can be regarded as the transmission power for the PSSCH that does not overlap the PSCCH in the time domain. Further, the transmission power for the PSCCH is determined according to the second criterion. If the second criterion indicates that the power spectrum densities of the PSCCH and the PSSCH are the same, the transmission power for the PSCCH can be determined according to the frequency domain resources occupied by the PSCCH and the power spectrum density of the PSSCH, and the transmission power for the PSSCH that overlaps the PSCCH in the time domain is determined according to the power spectrum density of the PSSCH and the frequency domain resources of the PSSCH that overlaps the PSCCH in the time domain.

It should be understood that, in an embodiment of the present application, the resources occupied by the first physical sidelink channel and the second physical sidelink channel may overlap, or may not overlap, which is not specifically limited in the embodiments of the present application.

In summary, the first terminal can determine the transmission power for the physical sidelink channel according to the first criterion that is pre-configured or is configured by the network device. For example, the first terminal can be configured to determine the transmission power according to the first path loss or the second path loss, so that the interference on the uplink channel by the sidelink channel can be controlled.

Alternatively, the first terminal can determine the transmission power for the physical sidelink channel according to the first criterion by itself. For example, the first terminal can determine the transmission power according to the attributes of the data to be transmitted, the first path loss, the second path loss, etc., which is beneficial to guarantee the characteristics such as the reliability and low latency of the sidelink data transmission.

Alternatively, the first terminal may determine the transmission power for the physical sidelink channel according to the first criterion configured by the group head terminal. As such, the group head terminal can control the transmission power of the terminals in the group, thereby ensuring the characteristics such as the reliability and low delay of the communication between the terminals in the group, and such power control method can be applied to scenarios with high delay and reliability requirements such as vehicle formations.

The wireless communication method according to the embodiments of the present application is described in detail from the perspective of the first terminal in connection with FIGS. 2 and 3. The following describes in detail a wireless communication method according to another embodiment of the present application from the perspective of a network device or a group head terminal with reference to FIG. 4. It should be understood that the description on the network device or the group head terminal side corresponds to the description on the first terminal side, and reference can be made to similar descriptions above, which will not be repeated here.

FIG. 4 is a schematic flowchart of a wireless communication method 300 according to another embodiment of the present application. The method 300 may be performed by the network device in the communication system shown in FIG. 1. As shown in FIG. 4, the method 300 includes the following content.

At S310, a first device sends first indication information to a first terminal, where the first indication information is used for indicating a first criterion, and the first criterion is used for the first terminal to determine a target transmission power for transmitting a first physical sidelink channel to a second terminal.

Optionally, in some embodiments, the first device is a network device or a group head terminal of a communication group in which the first terminal is located.

That is, the first criterion may be configured by the network device or the group head terminal, or the first criterion may also be pre-configured.

In some specific embodiments, the network device or the group head terminal can configure the first terminal to determine the target transmission power used for transmitting the first physical sidelink channel according to a first path loss, a second path loss, or attributes of the sidelink data to be transmitted when certain conditions are met. For specific implementations, reference may be made to relevant description of the foregoing embodiments Optionally, in some embodiments, the first criterion is used for indicating at least one of the following:

determining the target transmission power according to a maximum transmission power of the terminal device;

determining the target transmission power according to first configuration information;

determining the target transmission power according to a first transmission power, where the first transmission power is determined according to a first path loss, and the first path loss is a path loss between the first terminal and the network device;

determining the target transmission power according to a second transmission power, where the first transmission power is determined according to a second path loss, and the second path loss is a path loss between the first terminal and the second terminal;

determining the target transmission power according to the first path loss, where the first path loss is the path loss between the first terminal and the network device;

determining the target transmission power according to the second path loss, where the second path loss is the path loss between the first terminal and the second terminal;

determining the target transmission power according to a minimum of the first transmission power and the second transmission power;

determining the target transmission power according to a maximum of the first transmission power and the second transmission power;

determining the target transmission power according to a first attribute of sidelink data to be transmitted and a first threshold; and determining the target transmission power according to a type of the first physical sidelink channel.

Optionally, in some embodiments, the first configuration information includes a first mapping relationship, and the first mapping relationship is a mapping relationship between a maximum transmission power and at least one of priority information and a channel busy ratio (CBR).

Optionally, in some embodiments, the first attribute includes at least one of the following: a priority, reliability, a throughput, a transmission rate, a transmission distance, and a communication distance; and the first threshold is at least one of the following: a priority threshold, a reliability threshold, a throughput threshold, a transmission rate threshold, a transmission distance threshold, and a communication distance threshold.

Optionally, in some embodiments, the method further includes:

the first device receiving second indication information sent by the first terminal, where the second indication information is used for indicating the first attribute of the sidelink data to be transmitted.

Optionally, in some embodiments, the method further includes:

the first device determining the first criterion indicated by the first indication information according to the first attribute.

Optionally, in some embodiments, the first device determining the first criterion indicated by the first indication information according to the first attribute includes:

if the first attribute is higher than a second threshold, determining that the first criterion indicates determining the target transmission power according to the second transmission power or the second path loss; or if the first attribute is less than or equal to the second threshold, determining that the first criterion indicates determining the target transmission power according to the first transmission power or the first path loss.

Optionally, in some embodiments, the method further includes:

the first device sending a second criterion to the first terminal, where the second criterion is used for the first terminal to determine the target transmission power for transmitting a second physical sidelink channel to the second terminal.

Optionally, in some embodiments, the second criterion includes at least one of the following:

the transmission power for the second physical sidelink channel is the same as the transmission power for the first physical sidelink channel;

there is a first difference between the transmission power for the second physical sidelink channel and the transmission power for the first physical sidelink channel;

a power spectral density of the second physical sidelink channel is the same as a power spectral density of the first physical sidelink channel;

there is a second difference between the power spectral density for the second physical sidelink channel and the power spectral density for the first physical sidelink channel; and a ratio of the power spectral density for the second physical sidelink channel to the power spectral density for the first physical sidelink channel is a first ratio.

The method embodiments of the present application have been described in detail above with reference to FIGS. 2 to 4, and the device embodiments of the present application will be described in detail below in conjunction with FIGS. 5 to 9. It should be understood that the device embodiments and the method embodiments correspond to each other, and for similar description, reference can be made to the method embodiments.

FIG. 5 is a schematic block diagram of a terminal device 400 according to an embodiment of the present application. As shown in FIG. 5, the device 400 includes:

a determining module 410 configured to determine a target transmission power for a first physical sidelink channel according to a first criterion; and a communication module 420 configured to transmit the first physical sidelink channel to a second terminal with the target transmission power.

Optionally, in some embodiments, the first criterion is used for indicating at least one of the following:

determining the target transmission power according to a maximum transmission power of the terminal device;

determining the target transmission power according to first configuration information;

determining the target transmission power according to a first transmission power, where the first transmission power is determined according to a first path loss, and the first path loss is a path loss between the first terminal and a network device;

determining the target transmission power according to a second transmission power, where the first transmission power is determined according to a second path loss, and the second path loss is a path loss between the first terminal and the second terminal;

determining the target transmission power according to the first path loss, where the first path loss is the path loss between the first terminal and the network device;

determining the target transmission power according to the second path loss, where the second path loss is the path loss between the first terminal and the second terminal;

determining the target transmission power according to a minimum of the first transmission power and the second transmission power;

determining the target transmission power according to a maximum of the first transmission power and the second transmission power;

determining the target transmission power according to a first attribute of sidelink data to be transmitted and a first threshold; and determining the target transmission power according to a type of the first physical sidelink channel.

Optionally, in some embodiments, the first criterion is pre-configured; or the first criterion is configured by the network device; or
the first criterion is configured by a third terminal, where the third terminal is a group head terminal of a communication group in which the device is located.

Optionally, in some embodiments, the first configuration information includes a first mapping relationship, and the first mapping relationship is a mapping relationship between a maximum transmission power and at least one of priority information and a channel busy ratio (CBR).

Optionally, in some embodiments, the determining module 410 is specifically configured to: determine a maximum transmission power according to a priority of the sidelink data to be transmitted and/or a CBR of the current channel in combination with the first mapping relationship; and determine the maximum transmission power as the target transmission power for the first physical sidelink channel.

It should be understood that the maximum transmission power here is the maximum transmission power determined according to the first configuration information.

Optionally, in some embodiments, the determining module 410 is further configured to:

determine, by the first terminal, the target transmission power for the first physical sidelink channel according to a minimum of the following: a maximum transmission power; and a minimum of the first transmission power and the second transmission power, where the maximum transmission power includes a maximum transmission power determined according to the first configuration information, and/or the maximum transmission power of the first terminal.

Optionally, in some embodiments, the determining module 410 is further configured to:

determine, by the first terminal, the target transmission power for the first physical sidelink channel according to a minimum of the following: a maximum transmission power; and a maximum of the first transmission power and the second transmission power, where the maximum transmission power includes a maximum transmission power determined according to the first configuration information, and/or the maximum transmission power of the first terminal.

Optionally, in some embodiments, the determining module 410 is further configured to:

determine the target transmission power for the first physical sidelink channel from the first transmission power and the second transmission power according to a first attribute of the sidelink data to be transmitted on the first physical sidelink channel and a first threshold.

Optionally, in some embodiments, the determining module 410 is further configured to:

determine the second transmission power as the target transmission power for the first physical sidelink channel if a requirement for the first attribute of the sidelink data to be transmitted is higher than the first threshold; or determine the first transmission power as the target transmission power for the first physical sidelink channel if the requirement for the first attribute of the sidelink data to be transmitted is less than or equal to the first threshold.

Optionally, in some embodiments, the device further includes:

the communication module 420 configured to transmit second indication information to a network device or a third terminal, where the second indication information is used for indicating the first attribute of the sidelink data to be transmitted, and the third terminal is a group head terminal of a communication group in which the device is located.

Optionally, in some embodiments, the first attribute includes at least one of the following: a priority, reliability, a throughput, a transmission rate, a transmission distance, and a communication distance; and the first threshold is at least one of the following: a priority threshold, a reliability threshold, a throughput threshold, a transmission rate threshold, a transmission distance threshold, and a communication distance threshold.

Optionally, in some embodiments, the determining module 410 is further configured to:

determine the first transmission power according to the first path loss; and determine the second transmission power according to the second path loss.

Optionally, in some embodiments, the determining module 410 is further configured to:

determine a target transmission power for a second physical sidelink channel according to the target transmission power for the first physical sidelink channel and a second criterion.

Optionally, in some embodiments, the second criterion includes at least one of the following:

the transmission power for the second physical sidelink channel is the same as the transmission power for the first physical sidelink channel;

there is a first difference between the transmission power for the second physical sidelink channel and the transmission power for the first physical sidelink channel;

a power spectral density of the second physical sidelink channel is the same as a power spectral density of the first physical sidelink channel;

there is a second difference between the power spectral density for the second physical sidelink channel and the power spectral density for the first physical sidelink channel; and a ratio of the power spectral density for the second physical sidelink channel to the power spectral density for the first physical sidelink channel is a first ratio.

Optionally, in some embodiments, the second criterion is pre-configured; or the second criterion is configured by a network device; or
the second criterion is configured by a third terminal, where the third terminal is a group head terminal of a communication group in which the device is located.

It should be understood that the device 400 according to the embodiments of the present application can correspond to the first terminal in the method embodiments of the present application, and the above-mentioned and other operations and/or functions of the units in the device 400 are used to implement the process for the first terminal in method 200 as shown in FIG. 2, which will not be repeated here for the sake of brevity.

FIG. 6 is a schematic block diagram of a wireless communication device according to an embodiment of the present application. The device 500 of FIG. 6 includes:

a communication module 510 configured to send first indication information to a first terminal, where the first indication information is used for indicating a first criterion, and the first criterion is used for the first terminal to determine a transmission power for transmitting a first physical sidelink channel to a second terminal.

Optionally, in some embodiments, the first criterion is used for indicating at least one of the following:

determining the target transmission power according to a maximum transmission power of the terminal device;

determining the target transmission power according to first configuration information;

determining the target transmission power according to a first transmission power, where the first transmission power is determined according to a first path loss, and the first path loss is a path loss between the first terminal and the network device;

determining the target transmission power according to a second transmission power, where the first transmission power is determined according to a second path loss, and the second path loss is a path loss between the first terminal and the second terminal;

determining the target transmission power according to the first path loss, where the first path loss is the path loss between the first terminal and the network device;

determining the target transmission power according to the second path loss, where the second path loss is the path loss between the first terminal and the second terminal;

determining the target transmission power according to a minimum of the first transmission power and the second transmission power;

determining the target transmission power according to a maximum of the first transmission power and the second transmission power;

determining the target transmission power according to a first attribute of sidelink data to be transmitted and a first threshold; and determining the target transmission power according to a type of the first physical sidelink channel.

Optionally, in some embodiments, the first configuration information includes a first mapping relationship, and the first mapping relationship is a mapping relationship between a maximum transmission power and at least one of priority information and a channel busy ratio (CBR).

Optionally, in some embodiments, the first attribute includes at least one of the following: a priority, reliability, a throughput, a transmission rate, a transmission distance, and a communication distance; and the first threshold is at least one of the following: a priority threshold, a reliability threshold, a throughput threshold, a transmission rate threshold, a transmission distance threshold, and a communication distance threshold.

Optionally, in some embodiments, the communication module 510 is further configured to:

receive second indication information sent by the first terminal, where the second indication information is used for indicating the first attribute of the sidelink data to be transmitted.

Optionally, in some embodiments, the device further includes:

a determining module configured to determine the first criterion indicated by the first indication information according to the first attribute.

Optionally, in some embodiments, the determining module is specifically configured to:

determine that the first criterion indicates determining the target transmission power according to the second transmission power or the second path loss if the first attribute is higher than a second threshold; or determine that the first criterion indicates determining the target transmission power according to the first transmission power or the first path loss if the first attribute is less than or equal to the second threshold.

Optionally, in some embodiments, the communication module 510 is further configured to:

send a second criterion to the first terminal, where the second criterion is used for the first terminal to determine a target transmission power for transmitting a second physical sidelink channel to the second terminal.

Optionally, in some embodiments, the second criterion includes at least one of the following:

the transmission power for the second physical sidelink channel is the same as the transmission power for the first physical sidelink channel;

there is a first difference between the transmission power for the second physical sidelink channel and the transmission power for the first physical sidelink channel;

a power spectral density of the second physical sidelink channel is the same as a power spectral density of the first physical sidelink channel;

there is a second difference between the power spectral density for the second physical sidelink channel and the power spectral density for the first physical sidelink channel; and a ratio of the power spectral density for the second physical sidelink channel to the power spectral density for the first physical sidelink channel is a first ratio.

Optionally, in some embodiments, the device is a network device or a group head terminal of a communication group in which the first terminal is located.

It should be understood that the device 500 according to the embodiment of the present application can correspond to the first device in the method embodiments of the present application, and the above-mentioned and other operations and/or functions of the units in the device 500 are used to implement the corresponding process of the first device in the method 300 of FIG. 4, which will not be repeated here for the sake of brevity.

Figure 7:
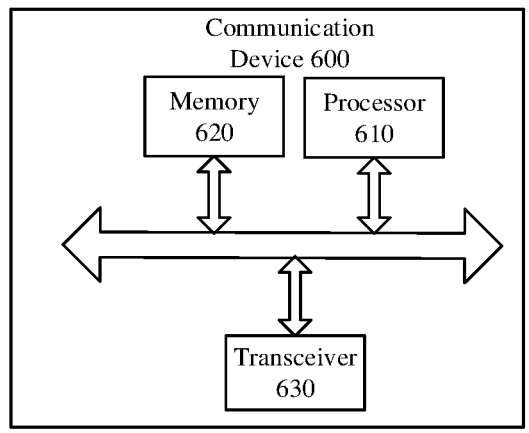
FIG. 7 is a schematic block diagram of a communication device according to another embodiment of the present application.

FIG. 7 is a schematic structural diagram of a communication device 600 according to an embodiment of the present application. The communication device 600 shown in FIG. 7 includes a processor 610. The processor 610 can call and execute a computer program from a memory to carry out the methods in the embodiments of the present application.

Optionally, as shown in FIG. 7, the communication device 600 can further include a memory 620. The processor 610 can call and run the computer program from the memory 620 to carry out the methods in the embodiments of the present application.

The memory 620 can be a separate device independent of the processor 610, or can be integrated in the processor 610.

Optionally, as shown in FIG. 7, the communication device 600 can further include a transceiver 630, and the processor 610 can control the transceiver 630 to communicate with other devices, and specifically, to transmit information or data to other devices, or to receive information or data transmitted from other devices.

The transceiver 630 can include a transmitter and a receiver. The transceiver 630 can further include an antenna, and the number of the antennas can be one or more.

Optionally, the communication device 600 can specifically be the network device or the group head terminal in the embodiments of the present application, and the communication device 600 can carry out the corresponding processes which are implemented by the network device or the group head terminal in the methods of the embodiments of the present application, which will not be repeated here for the sake of brevity.

Optionally, the communication device 600 can specifically be the first terminal in the embodiments of the present application, and the communication device 600 can implement the corresponding process that is implemented by the first terminal in the methods according to the embodiments of the present application, which will not be repeated here for the sake of brevity.

Figure 8:
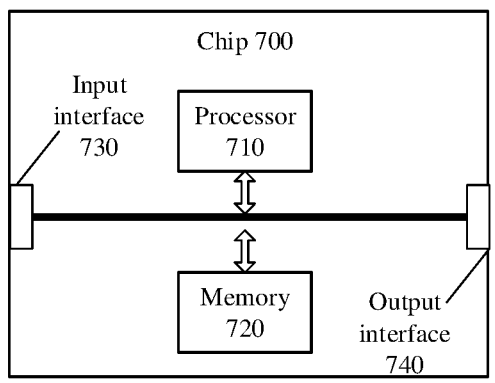
FIG. 8 is a schematic block diagram of a chip according to an embodiment of the present application.

FIG. 8 is a schematic structural diagram of a chip in an embodiment of the present application. The chip 700 shown in FIG. 8 includes a processor 710 which can call and run a computer program from a memory to implement the methods in the embodiments of the present application.

Optionally, as shown in FIG. 8, the chip 700 can further include a memory 720. The processor 710 can call and run the computer program from the memory 720 to implement the methods in the embodiments of the present application.

The memory 720 can be a separate device independent of the processor 710, or can be integrated in the processor 710.

Optionally, the chip 700 can further include an input interface 730. The processor 710 can control the input interface 730 to communicate with other devices or chips, and specifically, to obtain information or data transmitted by other devices or chips.

Optionally, the chip 700 can further include an output interface 740. The processor 710 can control the output interface 740 to communicate with other devices or chips, and specifically, to output information or data to other devices or chips.

Optionally, the chip can be applied to the first terminal in the embodiments of the present application, and the chip can implement the corresponding process which is implemented by the first terminal in the methods according to the embodiments of the present application, which will not be repeated here for the sake of brevity.

Optionally, the chip can be applied to the network device or the group head terminal in the embodiments of the present application, and the chip can carry out the corresponding processes which are implemented by the network device or the group head terminal in the methods of the embodiments of the present application, which will not be repeated here for the sake of brevity.

It should be understood that the chip mentioned in the embodiments of the present application can also be referred to as a system-level chip, a system chip, a chip system, or a system-on-chip.

Figure 9:
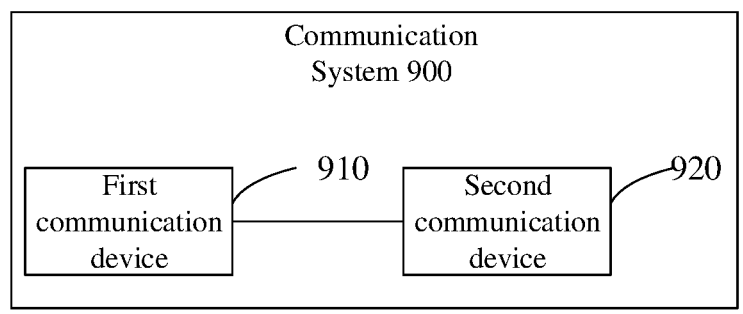
FIG. 9 is a schematic block diagram of a communication system according to an embodiment of the present application.

FIG. 9 is a schematic block diagram of a communication system 900 provided by an embodiment of the present application. As shown in FIG. 9, the communication system 900 includes a first communication device 910 and a second communication device 920.

The first communication device 910 can be used to implement the corresponding functions implemented by the first terminal in the above methods, and the second communication device 920 can be used to implement the corresponding functions implemented by the network device or the group head terminal in the above methods, which will not be repeated here for the sake of brevity.

It should be understood that the processor according to the embodiments of the present application can be an integrated circuit chip with signal processing capability. In the implementations, the steps of the foregoing method embodiments can be completed by an integrated logic circuit of hardware in the processor or by instructions in a form of software. The foregoing processor can be a general-purpose processor, a Digital Signal Processor (DSP), an Application Specific Integrated Circuit (ASIC), a Field Programmable Gate Array (FPGA), other programmable logic devices, discrete gate or transistor logic device, or a discrete hardware component, which can implement the methods, steps, and logical blocks disclosed in the embodiments of the present disclosure. The general-purpose processor can be a microprocessor, any conventional processor or the like. The steps of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the steps of the above methods in combination with the hardware thereof.

It can be understood that the memory in the embodiments of the present application may be a volatile memory or a non-volatile memory, or may include both the volatile and non-volatile memories. The non-volatile memory can be a Read-Only Memory (ROM), a Programmable ROM (PROM), an erasable PROM (EPROM), an electrically EPROM (EEPROM) or a flash memory. The volatile memory may be a Random Access Memory (RAM), which is used as an external cache. By way of exemplary but not restrictive description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM)) and a Direct Rambus RAM (DR RAM). It should be noted that the memories of the systems and methods described herein are intended to include, but are not limited to, these and any other suitable types of memories.

It should be understood that the foregoing description of the memory is exemplary rather than limiting. For example, the memory in the embodiments of the present disclosure can also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

The embodiments of the present application also provide a computer-readable storage medium for storing a computer program.

Optionally, the computer-readable storage medium can be applied to the network device in the embodiments of the present application, and the computer program causes a computer to perform the corresponding processes which are implemented by the network device in the methods of the embodiments of the present application, which will not be repeated here for the sake of brevity.

Optionally, the computer-readable storage medium can be applied to the mobile terminal/terminal device in the embodiments of the present application, and the computer program causes a computer to perform the corresponding processes which are implemented by the mobile terminal/ terminal device in the methods of the embodiments of the present application, which will not be repeated here for the sake of brevity.

The embodiments of the present application also provide a computer program product including computer program instructions.

Optionally, the computer program product can be applied to the network device in the embodiments of the present application, and the computer program instructions cause a computer to perform the corresponding processes implemented by the network device in the methods according to the embodiments of the present application, which will not be repeated here for the sake of brevity.

Optionally, the computer program product can be applied to the mobile terminal/terminal device in the embodiments of the present application, and the computer program instructions cause a computer to perform the corresponding processes which are implemented by the mobile terminal/terminal device in the methods of the embodiments of the present application, which will not be repeated here for the sake of brevity.

The embodiments of the application also provide a computer program.

Optionally, the computer program can be applied to the network device in the embodiments of the present application, and when running on a computer, the computer program causes the computer to perform the corresponding process implemented by the network device in the methods according to the embodiments of the present application, which will not be repeated here for the sake of brevity.

Optionally, the computer program can be applied to the mobile terminal/terminal device in the embodiments of the present application, and when running on a computer, the computer program causes the computer to perform the corresponding processes implemented by the mobile terminal/terminal device in the methods of the embodiments of the present application, which will not be repeated here for the sake of brevity.

Those of ordinary skill in the art can recognize that the exemplary units and algorithm steps described in connection with the embodiments disclosed herein can be implemented in electronic hardware or a combination of computer software and the electronic hardware. Whether these functions are implemented in hardware or in software depends on the specific applications of the technical solutions and design constraints. Various methods can be used by professional technicians to implement the described functions for each specific application, and such implementations should not be considered as going beyond the scope of the present application.

Those skilled in the art can clearly understand that for convenience and conciseness of the description, for the specific operating process of the systems, devices and units described above, reference can be made to corresponding processes in the foregoing method embodiments, which will not be repeated here.

It should be understood that the systems, devices, and methods disclosed in several embodiments of the present disclosure can be implemented in other manners. For example, the device embodiments described above are merely illustrative. For example, the division of the units is only a logical function division, and in actual implementations, there can be other division manners. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may be or may not be physically separated, and the components shown as units may be or may not be physical units, that is, they may be located in one place or may be distributed on multiple network units. Some or all of the units can be selected to achieve the objectives of the solutions of the embodiments according to actual requirements.

In addition, the functional units in the embodiments of the present disclosure can be integrated into one processing unit, or each unit can individually exist physically, or two or more of the units can be integrated into one unit.

If implemented in the form of software functional units and sold or used as an independent product, the functions can be stored in a computer-readable storage medium. Based on such understanding, the technical solution of the present disclosure essentially, a part thereof that contributes to the prior art, or a part of the technical solution can be embodied in the form of a software product, and the computer software product is stored in a storage medium and includes instructions which enable a computer device (which may be a personal computer, a server, a network device or the like) to perform all or part of the steps of the methods described in the embodiments of the present disclosure. The foregoing storage medium includes various medium such as a USB drive, a removable hard disk, a ROM, a RAM, a magnetic disk or an optical disc that can store program codes.

Those described above are only specific implementations of the present application, and the protection scope of the present application is not limited thereto. Any alteration or replacement readily devised by a person skilled in the art within the technical scope disclosed in the present disclosure shall fall within the scope of the present application. Therefore, the protection scope of the present application shall be subject to the protection scope of the claims.

What is claimed is:

1. A wireless communication method, comprising:
determining, by a first terminal, a target transmission power for a first physical sidelink channel according to a first criterion, wherein the first criterion is used for indicating to the first terminal to determine the target transmission power for the first physical sidelink channel as a minimum among a maximum transmission power, a first transmission power and a second transmission power, and wherein the maximum transmission power comprises a maximum transmission power determined according to first configuration information, and/or the maximum transmission power of the first terminal; and
transmitting, by the first terminal, the first physical sidelink channel to a second terminal with the target transmission power;
wherein the first transmission power is determined according to a first path loss, and the first path loss is a path loss between the first terminal and a network device; and
wherein the second transmission power is determined according to a second path loss, and the second path loss is a path loss between the first terminal and the second terminal,
wherein the target transmission power satisfies the following formula:

$$P=\min[P_{cmax}, P_{max\text{-}CBR}, \min(P_1, P_2)]$$

wherein P is the target transmission power, $P_{cmax}$ is the maximum transmission power of the first terminal, $P_{max\text{-}CBR}$ is the maximum transmission power determined according to the first configuration information, $P_1$ is the first transmission power, and $P_2$ is the second transmission power.

2. The method according to claim 1, wherein the second path loss is determined by the first terminal according to a Sidelink Reference Signal Receiving Power (S-RSRP) sent by the second terminal.

3. The method according to claim 1, wherein,
the first criterion is pre-configured; or
the first criterion is configured by a network device.

4. The method according to claim 1, wherein the first configuration information comprises a first mapping relationship, and the first mapping relationship is a mapping relationship between a maximum transmission power and at least one of priority information and a channel busy ratio (CBR).

5. The method according to claim 4, wherein the determining, by the first terminal, the target transmission power for the first physical sidelink channel according to the first criterion comprises:
determining, by the first terminal, the maximum transmission power according to a priority of the sidelink data to be transmitted and/or the CBR, in combination with the first mapping relationship.

6. The method according to claim 1, wherein the first criterion is further used for indicating:
determining the target transmission power according to a first attribute of sidelink data to be transmitted and a first threshold,
wherein the first attribute comprises a priority, and the first threshold is a priority threshold.

7. The method according to claim 1, wherein the first terminal also sends an uplink channel to a network device while transmitting the sidelink channel.

8. The method according to claim 7, further comprising:
determining, by the first terminal, to transmit only the first physical sidelink channel when a value of a priority of the sidelink data to be transmitted is less than, or less than or equal to a third threshold, or
determining, by the first terminal, to first guarantee the transmission power for the first physical sidelink channel, and to transmit the uplink channel with remaining power when there is the remaining power in the transmission power of the first terminal.

9. The method according to claim 1, further comprising:
determining, by the first terminal, a target transmission power for a second physical sidelink channel according to the target transmission power for the first physical sidelink channel and a second criterion, wherein the second criterion is used for indicating a relationship between a transmission power for the first physical sidelink channel and a transmission power for the second physical sidelink channel.

10. The method according to claim 9, wherein the second criterion comprises at least one of the following:
there is a first difference between the transmission power for the second physical sidelink channel and the transmission power for the first physical sidelink channel;
a power spectral density for the second physical sidelink channel is the same as a power spectral density for the first physical sidelink channel; and
a ratio of the power spectral density for the second physical sidelink channel to the power spectral density for the first physical sidelink channel is a first ratio.

11. The method according to claim 10, wherein:
the second criterion is pre-configured.

12. The method according to claim 11, wherein the first physical sidelink channel is a Physical Sidelink Shared Channel (PSSCH), the second physical sidelink channel is a Physical Sidelink Control Channel (PSCCH), and transmission time of the PSCCH overlaps transmission time of the PSSCH partly.

13. The method according to claim 12, wherein the determining, by the first terminal, the target transmission power for the first physical sidelink channel according to the first criterion comprises:
determining the transmission power for the PSSCH according to the first criterion, and wherein the transmission power for the PSSCH is a transmission power for the PSSCH that does not overlap the PSCCH in a time domain,
wherein the determining, by the first terminal, the target transmission power for the second physical sidelink channel according to the target transmission power for the first physical sidelink channel and the second criterion comprises:
determining the transmission power for the PSCCH according to the second criterion, wherein power spectrum densities of the PSCCH and the PSSCH are the same; and
determining the transmission power for the PSCCH according to frequency domain resources occupied by the PSCCH and the power spectrum density of the PSSCH.

14. The method according to claim 12, further comprising:
determining the transmission power for the PSSCH that overlaps the PSCCH in a time domain according to a power spectrum density of the PSSCH and frequency domain resources for the PSSCH that overlaps the PSCCH in the time domain.

15. A wireless communication device, comprising: a processor and a memory, wherein the memory is configured to store a computer program, and the processor is configured to call and run the computer program stored in the memory, to control the wireless communication device to
determine a target transmission power for a first physical sidelink channel according to a first criterion, wherein the first criterion is used for indicating to determine the target transmission power for the first physical sidelink channel as a minimum among a maximum transmission power, a first transmission power and a second transmission power, and wherein the maximum transmission power comprises a maximum transmission power determined according to first configuration information, and/or the maximum transmission power of the wireless communication device; and
transmit the first physical sidelink channel to a second terminal with the target transmission power,
wherein the first transmission power is determined according to a first path loss, and the first path loss is a path loss between the first terminal and a network device; and
wherein the second transmission power is determined according to a second path loss, and the second path loss is a path loss between the first terminal and the second terminal,
wherein the target transmission power satisfies the following formula:

$$P=\min[P_{cmax}, P_{max\text{-}CBR}, \min(P_1, P_2)]$$

wherein P is the target transmission power, $P_{cmax}$ is the maximum transmission power of the first terminal, $P_{max\text{-}CBR}$ is the maximum transmission power determined according to the first configuration information, $P_1$ is the first transmission power, and $P_2$ is the second transmission power.

16. The device according to claim 15, wherein the first criterion is further used for indicating:
determining the target transmission power according to a first attribute of sidelink data to be transmitted and a first threshold,
wherein the first attribute comprises a priority; and
the first threshold is a priority threshold.

17. The device according to claim 15, wherein the processor is configured to call and run the computer program stored in the memory, to further control the wireless communication device to:
determine a target transmission power for a second physical sidelink channel according to the target transmission power for the first physical sidelink channel and a second criterion, wherein the second criterion is used for indicating a relationship between a transmission power for the first physical sidelink channel and a transmission power for the second physical sidelink channel.

18. The device according to claim 17, wherein the second criterion comprises at least one of the following:
there is a first difference between the transmission power for the second physical sidelink channel and the transmission power for the first physical sidelink channel;
a power spectral density for the second physical sidelink channel is the same as a power spectral density for the first physical sidelink channel; and
a ratio of the power spectral density for the second physical sidelink channel to the power spectral density for the first physical sidelink channel is a first ratio.

19. The device according to claim 17, wherein the first physical sidelink channel is a Physical Sidelink Shared Channel (PSSCH), the second physical sidelink channel is a Physical Sidelink Control Channel (PSCCH), and transmission time of the PSCCH overlaps transmission time of the PSSCH partly,
wherein the processor is configured to call and run the computer program stored in the memory, to further control the wireless communication device to:
determine the transmission power for the PSSCH according to the first criterion, and wherein the transmission power for the PSSCH is a transmission power for the PSSCH that does not overlap the PSCCH in a time domain,
determine the transmission power for the PSCCH according to the second criterion, wherein power spectrum densities of the PSCCH and the PSSCH are the same; and
determine the transmission power for the PSCCH according to frequency domain resources occupied by the PSCCH and the power spectrum density of the PSSCH.

20. A wireless communication device, comprising: a processor and a memory, wherein the memory is configured to store a computer program, and the processor is configured to call and run the computer program stored in the memory, to control the wireless communication device to
configure a first terminal with a first criterion, wherein the first criterion is used for the first terminal to determine a target transmission power for transmitting a first physical sidelink channel to a second terminal, wherein the first criterion comprises determining the target transmission power for the first physical sidelink channel as a minimum among a maximum transmission power, a first transmission power and a second transmission power, and wherein the maximum transmission power comprises a maximum transmission power determined according to first configuration information, and/or the maximum transmission power of the first terminal,
wherein the first transmission power is determined according to a first path loss, and the first path loss is a path loss between the first terminal and a network device; and
wherein the second transmission power is determined according to a second path loss, and the second path loss is a path loss between the first terminal and a second terminal,
wherein the target transmission power satisfies the following formula:

$$P=\min[P_{cmax}, P_{max\text{-}CBR}, \min(P_1, P_2)]$$

wherein P is the target transmission power, $P_{cmax}$ is the maximum transmission power of the first terminal, $P_{max\text{-}CBR}$ is the maximum transmission power determined according to the first configuration information, $P_1$ is the first transmission power, and $P_2$ is the second transmission power.

* * * * *